| United States Patent [19] | [11] | 4,067,742 |
|---|---|---|
| Fletcher et al. | [45] | Jan. 10, 1978 |

[54] THERMAL SHOCK AND EROSION RESISTANT TANTALUM CARBIDE CERAMIC MATERIAL

[76] Inventors: James C. Fletcher, Administrator of the National Aeronautics and Space Administration, with respect to an invention of Leroy Honeycutt, III, Winston-Salem; Charles R. Manning, Jr., Raleigh, both of N.C.

[21] Appl. No.: 672,695

[22] Filed: Apr. 1, 1976

[51] Int. Cl.$^2$ ............................................... C04B 35/52
[52] U.S. Cl. ................................. 106/43; 60/200 A; 75/229; 75/239; 75/241
[58] Field of Search .................. 106/43, 55, 56; 29/182.7, 182.8; 75/203, 204, 174, 229, 239, 241; 60/200 A

[56] References Cited

U.S. PATENT DOCUMENTS

| 1,936,435 | 11/1933 | Kelley | 29/182.7 |
|---|---|---|---|
| 2,021,576 | 11/1935 | McKenna | 29/182.7 |
| 2,039,822 | 5/1936 | McKenna | 29/182.7 X |
| 3,226,929 | 1/1966 | McKenna | 75/241 |
| 3,379,520 | 4/1968 | Chang et al. | 75/174 |
| 3,779,716 | 12/1973 | Riley et al. | 75/204 X |

FOREIGN PATENT DOCUMENTS

| 1,384,013 | 11/1964 | France | 29/182.7 |
|---|---|---|---|

*Primary Examiner*—Helen M. McCarthy
*Attorney, Agent, or Firm*—Howard J. Osborn; Wallace J. Nelson; John R. Manning

[57] ABSTRACT

Ceramic tantalum carbide artifacts having high thermal shock and mechanical erosion resistance are provided by incorporating tungsten-rhenium and carbon particles in a tantalum carbide matrix. The mix is sintered by hot pressing to form the ceramic article which has a high fracture strength relative to its elastic modulus and thus has an improved thermal shock and mechanical erosion resistance. The tantalum carbide is preferable less than minus 100 mesh, the carbon particles are preferable less than minus 100 mesh, and the tungsten-rhenium particles are preferable elongate, having a length to thickness ratio of at least 2/1. Tungsten-rhenium wire pieces are suitable as well as graphite particles.

14 Claims, No Drawings

THERMAL SHOCK AND EROSION RESISTANT TANTALUM CARBIDE CERAMIC MATERIAL

ORIGIN OF THE DISCLOSURE

The invention described herein was made in the performance of work under a NASA contract and is subject to the provisions of Section 305 of the National Aeronautics and Space Act of 1958, Public Law 85-568 (72 STAT 435; 42 USC 2457).

BACKGROUND OF THE INVENTION

This invention relates to ceramic articles and to methods of making same. More particularly, the invention relates to tantalum carbide articles and to methods of making same.

There has long been a need for refractory materials capable of use in high temperature environments. Most recently, refractory materials have been developed for space applications. Typically, materials have been developed for throat areas of solid propellant rocket nozzles. These throat areas are subject not only to high temperatures and pressures but to severe thermal shock, to mechanical erosion, and to chemical erosion. Materials developed in the past for this application include graphite, tungsten, alumina, zirconia, and hafnia. However, each of these materials lacks resistance to one or more of the above areas of degradation. Zirconia, hafnia and graphite, which having excellent thermal shock resistance, has poor chemical and mechanical erosion resistance. Tungsten is heavy, hard to fabricate, and has poor chemical erosion resistance. Alumina, on the other hand has poor thermal shock resistance. Applicants' prior invention disclosed in U.S. Pat. No. 3,706,583, while adequate for the purposes intended, did not provide the improved thermal, mechanical and chemical erosion resistance as the present invention disclosed and claimed herein.

It is therefore an object of the present invention to provide an improved ceramic article having high thermal shock resistance. It is a further object to produce such an article having good mechanical and chemical erosion resistance at elevated temperatures. It is still a further object to provide such an article including tantalum carbide.

BRIEF SUMMARY OF THE INVENTION

The foregoing and other objects which will be apparent to those of ordinary skill in the art are achieved according to the present invention by providing a ceramic artifact comprising a tantalum carbide matrix and from one to five percent by weight for each addition based on the weight of the article, of either tungsten or tungsten-rhenium particles and carbon or graphite particles distributed throughout said matrix. The article is made by providing a mixture of particles or tantalum carbide and from one to five percent by weight for each addition of tungsten or tungsten-rhenium particles and carbon or graphite particles, and hot pressing the mixture at a sintering temperature and pressure sufficient to produce an article of at least 85 percent of theoretical density.

DETAILED DESCRIPTION

There follows a detailed description of a preferred embodiment of the invention. However, it is to be understood that the detailed description is solely for the purpose of illustrating a preferred embodiment and that the invention is capable of numerous modifications and variations apparent to those skilled in the art without departing from the spirit and scope of the invention.

EXAMPLES

Tantalum carbide specimens were fabricated by a vacuum hot pressing technique. Cylindrical specimens varying in diameter from ¾ inch to ½ inch and height from one inch to ¼ inch were formed by induction heating in conventional graphite dies. Contoured specimens averaging one inch in diameter (O.D.) and height varying from one inch to 1¼ inches with an entrance inside diameter averaging ⅝ inch and exit inside diameter averaging ⅜ inch diameter were formed by induction heating in conventional graphite dies. The temperature is maintained at or near 2150° C. in a vacuum of less than 10 microns of mercury. Pressures up to 8,000 pounds per square inch are applied during hot pressing.

The graphite dies are machined from Carborundum Graphatite A or G for pressures to four thousand pounds per square inch and Poco Graphite HPD-1 for pressures above those. All rams and plugs are fabricated from Poco Graphite HPD-1 or HPD-3 graphite. Tantalum end shields are placed between the ram and specimen to facilitate removal and to reduce carbon diffusion into the specimen.

Pressure is supplied by a conventional hydraulic press through a bellows assembly into a vacuum body which is evacuated by a 6-inch diffusion pump backed by a 750 standard cubic foot per minute mechanical pump. The graphite die is located inside a graphite and silica cloth lined induction coil within the vacuum chamber. The vacuum chamber is cooled by conventional water circulation in ⅜ inch tubing attached to the outside surface of the vacuum chamber. The temperature of the outside surface of the graphite die is read by a calibrated optical pyrometer through a series of sight ports through the vacuum chamber, coil and insulation. Die displacement readings for determination of densification termination is measured by a variable differential transducer and the output is read on a strip chart recorder.

The tantalum carbide used in these examples as the matrix material is minus 325 mesh (Tyler) particle size and preferably of reactor grade although commercial grade may be used.

Density determinations are by ASTM designation B311-58 entitled "Standard Method of Test for Density of Cemented Carbides" with no modifications. This technique is the immersion technique and distilled water is the immersion fluid used.

Specimens having a diameter of one-half inch and a height varying from ¼ inch to ⅜ inch are used to determine the apparent modulus of elasticity and compressive fracture strength. The small height to diameter ratio is employed to reduce the effect of barreling on strain measurements obtained by SR-4 strain gages cemented to each specimen.

Specimens are loaded in compression with a conventional tensile compressive testing machine. Strain is measured at intervals of 100 pounds static loading between 500 and 2000 pounds load. Strain in micro inches per inch is read from 120 ohm gages having a gage factor of 2.01 by use of a balanced bridge potentiometer. Polyester films are placed between the specimen ends and the compressive platens to reduce sliding friction on the self-alining platens. Loading is cycled a minimum of three times with the specimen in three positions (9 cycles total) to achieve reproducibility of strain readings. The values of stress are plotted against strain to assure linearity. Compressive fracture stress is given as that stress at which the first crack is observed to cause a discontinuity in the loading.

Specimens are tested for thermal shock resistance by exposing them to an oxygen-acetylene flame at a temperature of approximately 5000° C. for a period of 30 seconds and subsequently submerging them in stirred room temperature distilled water. The specimens nominally one-half inch in diameter and varying from ¾ inch to ⅜ inch in height, are heated from one end by the oxygen-acetylene flame. Specimen temperature averages 2000° C. before quenching. The difference in temperature ($\Delta T$) for thermal shock testing was approximately 1900° C. The criteria for failure is either total disintegration of the specimen or the presence of one or more macroscopic cracks traversing a portion or all of the specimen. The specimens were tested on both a one cycle and repeated cycle basis.

Specimens are tested for erosion resistance by exposing them to an oxygen-acetylene flame until a temperature of approximately 1800° C. and subjecting them to vertical impingement by 2.2 pounds of minus 325 mesh (Tyler) alumina particles at a velocity of 400 feet per second. The specimens nominally one inch in outside diameter and height varying from one inch to 1¼ inch with an entrance diameter of ⅝ inch and an exit diameter of ⅞ inch, are heated on the inside contoured surface by the oxygen-acetylene flame. Specimen temperature averages 1400° C. during the erosion testing. The criteria for failure is either total fracture by one or more macroscopic cracks traversing a portion or all of the specimen or a change in the exit diameter of more than 5%. Due to the phenomenal characteristics of erosion, a change in specimen weight of more than 0.50 grams was used as a criteria for failure. The specimens were tested on both a one-cycle and repeated-cycle basis.

Initially, base materials of the high density (98 percent of theoretical) and low density (80 percent of theoretical) are exposed to the described thermal stress and erosion environments. Of these materials, the higher density specimens exhibit the best thermal shock and erosion resistance. No spalling was evident in any specimens.

The tungsten or tungsten-rhenium added to the tantalum carbide is in form of wire, 0.005 inches in diameter, cut to a length of approximately one-quarter inch. The tungsten or tungsten-rhenium are mechanically mixed with the tantalum carbide particles using a conventional mixer. The carbon or graphite added to the tantalum carbide is in less than minus 200 mesh (Tyler) particles. The carbon or graphite particles are mechanically mixed using a conventional liquid to create a slurry and then dried. The carbon or graphite particles are wet mixed with the tantalum carbide particles and allowed to dry before mechanically dry mixing the tungsten or tungsten-rhenium particles with the tantalum carbide particles.

As shown in the following table, thermal shock resistance indicated by the ratio of compressive fracture stress to the modulus of elasticity, and the erosion resistance, indicated by the weight loss per 2.2 lbs of $Al_2O_3$ is increased by the addition of tungsten or tungsten-rhenium and carbon or graphite particles. In addition, no specimens containing tungsten or tungsten-rhenium particles exhibited thermal spalling, thermal cracking or cracking from erosion. No specimen containing carbon or graphite was cracked by either thermal exposure or erosion.

TABLE 1

| Sample Number | Wt % Tungsten | Wt % Carbon or graphite | Ratio of compressive fracture stress to modulus of elasticity | Wt. loss per 2.2lb $Al_2O_3$ | % Change in exit diameter |
| --- | --- | --- | --- | --- | --- |
| 1 | 0 | 1 | $5.8 \times 10^{-3}$ | .458 | 1.6 |
| 2 | 0 | 2 | $3.4 \times 10^{-3}$ | .283 | 2.1 |
| 3 | 0 | 3 | $2.6 \times 10^{-3}$ | .283 | 1.6 |
| 4 | 1 | 1 | $5.3 \times 10^{-3}$ | .246 | 0.5 |
| 5 | 3 | 1 | $7.5 \times 10^{-3}$ | .153 | 0.5 |
| 6 | 1 | 2 | $4.6 \times 10^{-3}$ | .196 | 1.4 |
| 7 | 3 | 2 | $7.0 \times 10^{-3}$ | .115 | 0.5 |
| 8 | 5 | 2 | $2.1 \times 10^{-3}$ | .539 | 0.8 |
| 9 | 0 | 0 | $1.6 \times 10^{-3}$ | .483 | 1.8 |

Similar results are obtained by substituting a tungsten-rhenium alloy for the tungsten shown in the above table and in essentially the same quantities. The term 'tungsten-rhenium' as used hereinafter denotes a tungsten wire alloyed with 25 weight percent of rhenium based on the total wire weight.

In view of the foregoing results, it is preferred to use from about 1 to about 5 percent by weight of tungsten or tungsten-rhenium and from about 1 to about 3 percent by weight of carbon or graphite to achieve a substantial increase in the ratio of compressive fracture stress to modulus of elasticity to substantially improve thermal shock and erosion resistance. It is preferred to also use from about 1 to about 3 percent by weight of carbon or graphite to substantially improve thermal shock and erosion resistance. Erosion resistance measured as the weight loss per 2.2 lbs of $Al_2O_3$ or percent change in exit diameter. Still more preferably, tungsten or tungsten-rhenium is used in an amount of from about 1 to about 3 percent by weight and carbon or graphite in an amount of from about 1 to about 2 percent by weight.

Thermal shock resistance is also related to density, lower density articles having less thermal shock resistance. In general, the density will be at least 80 percent of theoretical for most applications, with densities of about 85 percent of theoretical being preferred.

The tungsten and tungsten-rhenium particles are preferably elongate, having a length/thickness ratio of at least about 2/1. The size of the particles can vary widely and is generally chosen for ease of blending uniformly with the tungsten carbide particles. In general, the thickness of the pieces will be up to about 0.05 inches. The length/thickness ratio will generally be up to about 100/1 and will be somewhat related to diameter. Wire pieces are preferred and wire having a diameter of up to about 0.05 inches and a length/diameter ratio of 5/1 to 100/1 are preferred. The particle size of the carbon or graphite is conventional and is preferably at least minus 100 mesh, more preferably minus 200 mesh, and even more preferably less than minus 325 mesh for most applications, particularly where high density is concerned.

The hot pressing process of making the article is conventional and conventional temperatures and pressures for the hot pressing of ceramic artifacts are employed. In general, the temperature is at least 1700° C. and a temperature of about 2150° C. is preferred. Conventional pressures required to achieve desired density are employed, typical pressures being from 1000 to 10,000 pounds per square inch.

The particle size of the tantalum carbide is conventional and is preferably at least minus 100 mesh, more preferably minus 200 mesh and even more preferably minus 300 mesh for most applications, particularly where high density is desired.

Other factors such as the coefficient of thermal expansion, coefficient of heat transfer, and Poisson's Ratio also affect thermal shock resistance. Factors such as hardness, velocity of impinging particles, and particle shape also affect erosion resistance. However, these are either affected favorably or only slightly unfavorably by the present invention. The major effect is a change in the ratio of compressive fracture stress to modulus of elasticity which increases both thermal shock and erosion resistance.

What is claimed as new and desired to be secured by Letters Patent of the United States is:

1. A ceramic artifact adaptable for use in throat areas of rocket nozzles and the like which consists of a hot-pressed composite of at least 80 to 85 percent of theoretical density of a tantalum carbide matrix and from one to five percent by weight, based on the weight of the article, of particles of a metal selected from the group consisting of tungsten and tungsten-rhenium alloy, and from one to three percent by weight based on the weight of the article, of carbon or graphite particles and wherein the tantalum carbide matrix is formed from the group consisting of reactor grade and commercial grade particles.

2. A ceramic artifact according to claim 1 wherein the metal is tungsten and the amount of tungsten is from one to three weight percent.

3. A ceramic artifact according to claim 1 wherein the metal is tungsten-rhenium and the amount of tungsten-rhenium alloy is from one to three weight percent.

4. A ceramic artifact according to claim 1 wherein said metal particles are elongate pieces having a thickness of up to about 0.05 inches and a length/thickness ratio of at least 2/1.

5. A ceramic artifact according to claim 4 wherein the metal particles are wire pieces having a length/diameter ratio of between 5/1 and 100/1.

6. A ceramic artifact as in claim 1 wherein the carbon or graphite particles are between minus 100 mesh and minus 7. A method of making a ceramic article having high resistance to thermal shock comprising the steps of providing a mixture of particles of commercial grade tantalum carbide, from one to five percent by weight of a metal selected from the group consisting of tungsten and tungsten-rhenium alloy, and from one to three percent by weight of carbon or graphite particles and hot pressing the mixture in the temperature range of from 1700° C. to 2150° C. and at a pressure sufficient to produce an article of at least 80 to 85 percent of theoretical density.

8. A method according to claim 7 wherein the mixture is hot pressed at a pressure in the range of 1000 to 10,000 pounds per square inch.

9. A method according to claim 7 wherein the tantalum carbide particles are in the range of minus 100 mesh and minus 300 mesh size.

10. A method according to claim 7 wherein the metal is tungsten and the tungsten particles are elongate pieces having a thickness of up to about 0.05 inches and a length/thickness ratio of at least 2/1.

11. A method according to claim 7 wherein the metal is tungsten-rhenium alloy and the tungsten-rhenium alloy particles are wire pieces having a thickness of up to about 0.05 inches and a length/thickness ratio of at least 2/1.

12. A method according to claim 7 wherein the metal particles are elongate wire pieces having a length/diameter ratio of at least 5/1.

13. A method according to claim 7 wherein the carbon or graphite particles are in the size range of minus 100 mesh to minus 325 mesh.

14. A method according to claim 7 wherein the metal is tungsten wire alloyed with 25 percent weight of rhenium.

* * * * *